US009223582B2

(12) United States Patent
Mayer-Ullmann

(10) Patent No.: US 9,223,582 B2
(45) Date of Patent: Dec. 29, 2015

(54) USER INTERFACE DESCRIPTION LANGUAGE

(75) Inventor: Dietrich Mayer-Ullmann, Ilvesheim (DE)

(73) Assignee: SAP SE, Walldorf (DE)

( * ) Notice: Subject to any disclaimer, the term of this patent is extended or adjusted under 35 U.S.C. 154(b) by 60 days.

(21) Appl. No.: 13/229,992

(22) Filed: Sep. 12, 2011

(65) Prior Publication Data

US 2013/0067430 A1 Mar. 14, 2013

(51) Int. Cl.
*G06F 9/45* (2006.01)
*G06F 9/44* (2006.01)

(52) U.S. Cl.
CPC ... *G06F 9/44* (2013.01); *G06F 8/38* (2013.01)

(58) Field of Classification Search
USPC .......................................................... 717/106
See application file for complete search history.

(56) References Cited

U.S. PATENT DOCUMENTS

| | | | | |
|---|---|---|---|---|
| 6,083,276 | A * | 7/2000 | Davidson et al. | 717/107 |
| 7,607,150 | B1 * | 10/2009 | Kobayashi et al. | 725/41 |
| 2004/0056894 | A1 * | 3/2004 | Zaika et al. | 345/762 |
| 2006/0059461 | A1 * | 3/2006 | Baker et al. | 717/113 |
| 2007/0120856 | A1 * | 5/2007 | De Ruyter et al. | 345/440 |
| 2010/0013757 | A1 * | 1/2010 | Ogikubo | 345/156 |
| 2010/0318908 | A1 * | 12/2010 | Neuman et al. | 715/716 |
| 2012/0284631 | A1 * | 11/2012 | Lancioni et al. | 715/744 |

OTHER PUBLICATIONS

Limbourg, Quentin, et al. "Usixml: A user interface description language for context-sensitive user interfaces." Proceedings of the ACM AVI'2004 Workshop Developing User Interfaces with XML: Advances on User Interface Description Languages. 2004.*
Vanderdonckt, Jean. "A MDA-compliant environment for developing user interfaces of information systems." Advanced Information Systems Engineering. Springer Berlin Heidelberg, 2005.*

* cited by examiner

*Primary Examiner* — Chameli Das
*Assistant Examiner* — Joanne Macasiano
(74) *Attorney, Agent, or Firm* — Kenyon & Kenyon LLP

(57) ABSTRACT

Embodiments provide a method for generating a user interface (UI) using a UI description language. An exemplary method may be executed by a computer processor to designate each element of the UI as either a container element or a child element, store a design guideline as a set of editable rules, integrate the set of editable rules in a prototyping tool, integrate the prototyping tool in a development environment and render the UI by using a rules engine to interpret the set of editable rules.

24 Claims, 17 Drawing Sheets

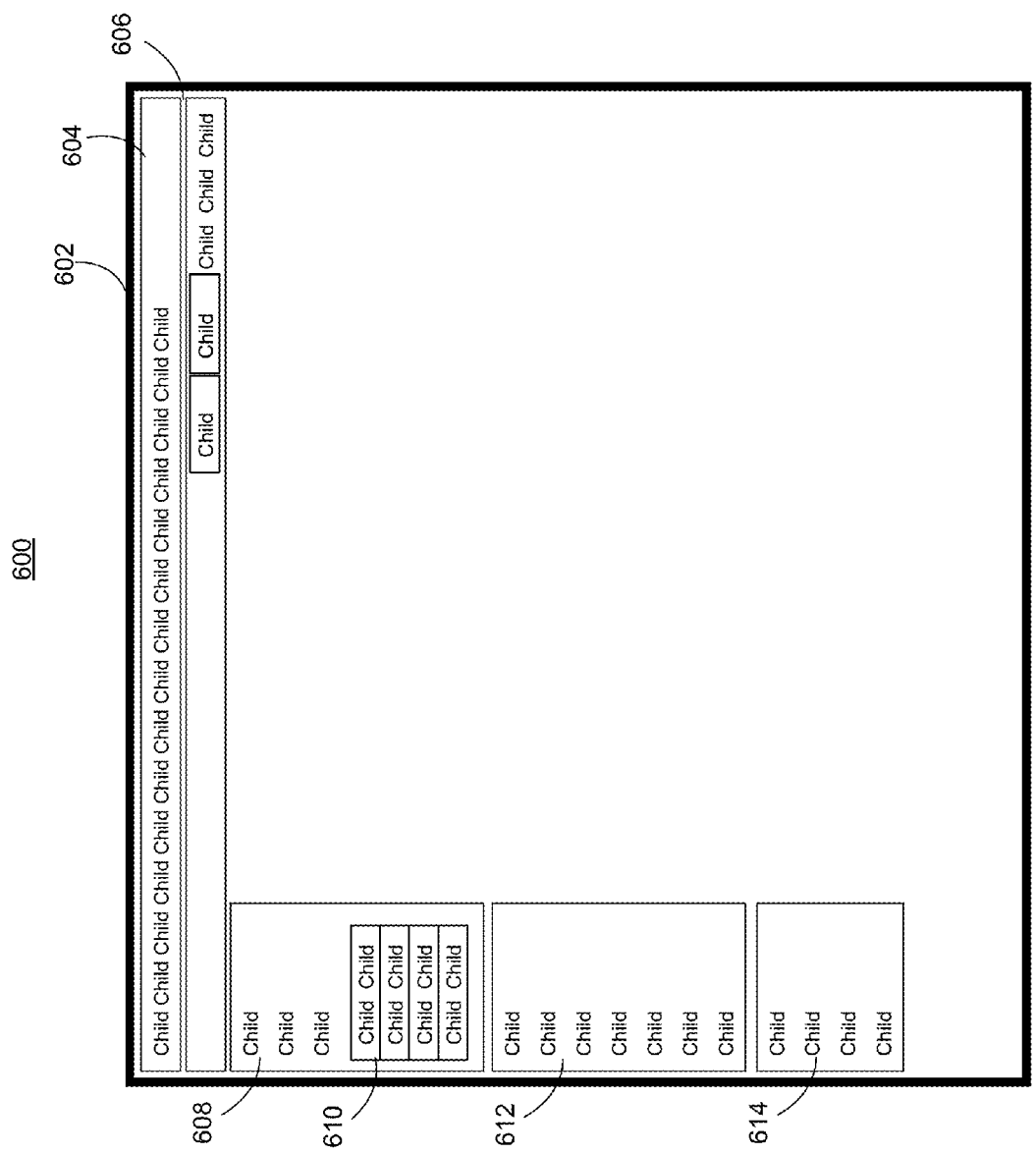

9,223,582 B2

USER INTERFACE DESCRIPTION LANGUAGE

BACKGROUND

Graphical user interfaces (GUIs), while less common in the early days of computing, have become common place among computing applications. GUIs allow users to operate an underlying program, application or other system to accomplish some task or set of tasks through interactions with one or more visual components of the GUIs.

With the advances in hardware technologies, today's computer software including the GUIs must be adapted to run on a variety of computer systems to interact with users. However, delivering a beautiful and good usable user interface (UI) requires a lot of different ingredients, especially when the targeting platforms may include a variety of computing machines, for example, desktop computers, tablets computers, mobile devices, and touch pad devices.

GUIs are normally developed based on user interface guidelines. In order to achieve consistency and homogeneity of designs, user interface guidelines typically provide an exact description which objects may be used on an interface in which context. User interface guidelines usually contain sets of rules and corresponding examples for the application of the rules. The development of the rules depends heavily on results of user research, input from solution managers and customers, and—in many cases—also on the technology used for the implementation of the software product.

User interface designers apply those guidelines during the design process when creating user interface mockups and prototypes, and also apply those guidelines during the evaluation of implemented software products. Those prototypes can be validated and iteratively modified—while the guidelines also have to be followed during the modification and adaptation phases.

The finalized user interface prototypes are then handed over to development with expectation that the interface guidelines are followed by implementing the interface exactly as shown in the prototype. But frequently, the gaps between a prototyped and developed interface are quite significant. Those gaps then have to be removed in an additional step of evaluation and development. One reason for the gaps is the necessary translation from prototype to implemented interface. Translations done under time pressure typically yield incomplete and/or incorrect results. Another problem is that changes in the guidelines made during the development process always have an impact on the interface prototypes but don't have an impact on the corresponding implementation.

In the current approach to UI design, some ingredients are really hard to get in order to achieve high design quality. The most lacking and thus most critical ingredients are always related to time constraints, for example, limited time to understand Guidelines, to agree on different design opinions, to adjust Guideline changes to an UI, to test UIs, to provide one consistent UI for different technology platforms and devices, to create UI Mockup variants for choosing the best out of it, to fix UI implementation errors, and to create different UI flavors to match special user groups.

To make the matter worse, time for UI design work is always wasted because during a UI design process there are always a lot of different opinions about the quality of the design. There is no measurement of the UI usability available to get absolute measurement results. Different participants in UI design have different opinions about beautifulness and intuitive interaction design because everybody has different pictures in mind. These different pictures are error prone and lead to a lot of inconsistencies and mistakes during the mass production of user interfaces within a software vendor. Further, there is no straight forward communication between mockuped, implemented, and configured UI designs because the interfaces between the different media cannot talk to each other in a compatible way. Thus the entire design and development process costs too much time and money.

Moreover, the currently existing description languages, such as CSS, HTML and other scripting languages to code UI designs, always mix visual and interaction design within the coding. Focusing on these languages (programming languages) is development but not UI design. There is currently no clear separation between UI layout structure, visual appearance and dynamic interaction behavior. Accordingly, there is a need in the art to provide a common description language for UI design that may separate the UI layout structure, visual appearance from scripting language code that defines the dynamic interaction behavior.

BRIEF DESCRIPTION OF THE DRAWINGS

FIG. 4A illustrates a position property according to another embodiment of the present invention.

FIGS. 6A, 6B, 6C, 6D and 6E illustrate a UI layout design process according to an embodiment of the present invention.

DETAILED DESCRIPTION

Figure 1:
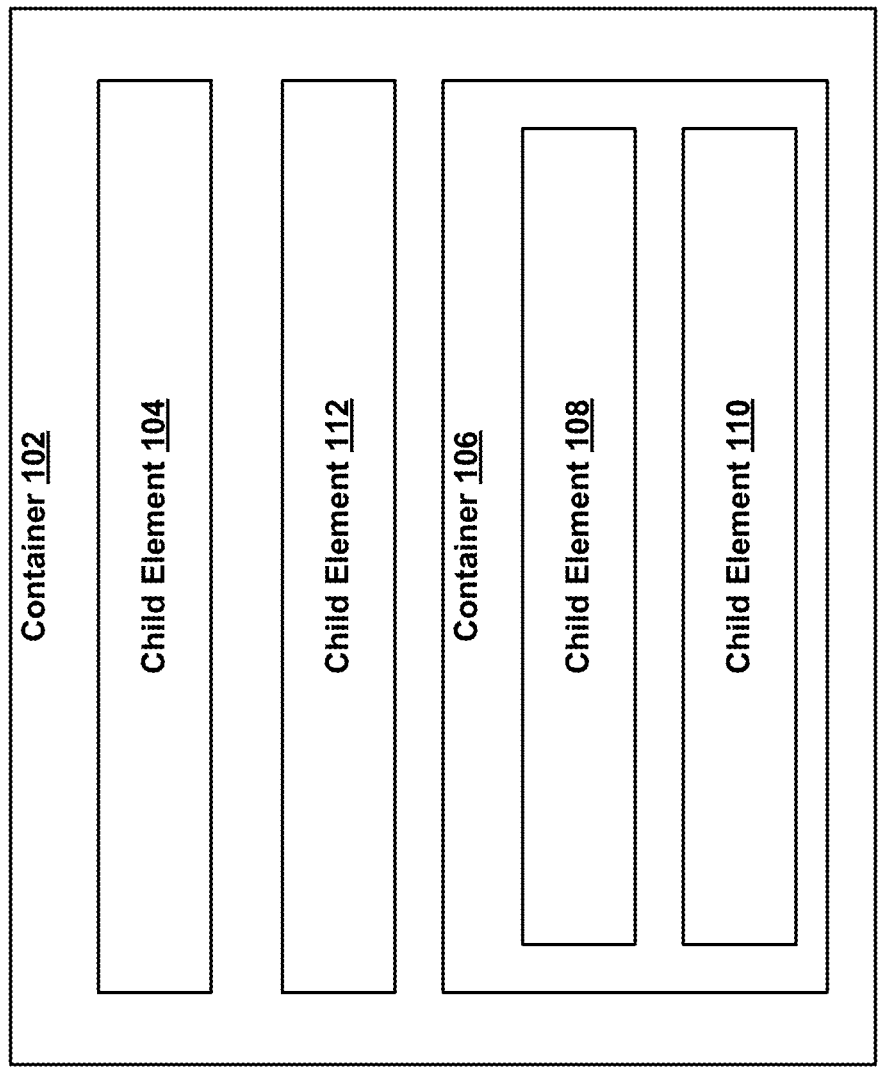
FIG. 1 illustrates a block diagram of a UI according to an embodiment of the present invention.

Embodiments provide a method for generating a user interface (UI) using a UI description language. An exemplary method may be executed by a computer processor to designate each element of the UI as either a container element or a child element, store a design guideline as a set of editable rules, integrate the set of editable rules in a prototyping tool, integrate the prototyping tool in a development environment and render the UI by using a rules engine to interpret the set of editable rules.

In another embodiment, a non-transitory machine readable storage medium embodied with computer instructions may be provided. The computer instructions when executed may cause a processor to perform a method for generating a UI using a UI description language. The processor may designate each element of the UI as either a container element or a child element, store a design guideline as a set of editable rules, integrate the set of editable rules in a prototyping tool, integrate the prototyping tool in a development environment and render the UI by using a rules engine to interpret the set of editable rules.

Embodiments of the present invention may provide a universal UI description language to enable the communication about a UI design (visual and interaction design) between different groups of people and technical systems to validate and check concepts and implementations in a neutral way (e.g., a neutral validation without having biased factors disturbing the results). The communication may happen much faster in comparison to current communication processes. The UI description language may reduce errors and mistakes that usually results during UI design and development process. The UI description language may be used to support the currently existing data protocols used to connect frameworks and UI design concepts, and also made to support the rule-based prototyping. Thus, the UI description language may take advantage of existing rules engine (such as, for example, BRM and/or BRF plus provided by software vender SAP) for controlling UI mockup, implementation, and configuration according to UI guidelines and concepts. Further, the UI description language may also facilitate providing one application to different devices without implementing the same application multiple times for each kind of device (which may end in inconsistent UIs).

In one embodiment, the UI description language may help transfer actual design problems and use cases to an abstract description. The UI description language may be used to represent a common understanding about the UI topics. A UI description could keep distracting factors like subjective emotions due to coloring or habitual interaction behavior far away. The description language may create a new interface between technical tools and UI in any appearance for enabling usability checks and variant configurations. The UI description language may make it much simpler to connect usability measurement methods and tools to get neutral results. Further, the UI description language may make it much simpler to check UIs for errors before implementation starts.

The UI description language according to one embodiment may be translated into a real implemented user interface in a very short time. The translation may be done much faster compared to similar activities in current UI design processes. Further, the UI description language may make it possible to switch between UI concepts to match specific requirements, for example, UI concepts for different devices without extra implementation effort.

In one embodiment, a UI according to one embodiment may be described by a more or less complex hierarchy which consists of two types of elements: containers and container child elements. A container may contain child elements and/or containers as child elements. In one embodiment, if a container contains only one child element, it may change to a child element of the container's parent container. All containers and child elements may have properties that describe the visual and interaction design. Each UI element on a screen may be described with these container and child element building blocks. The properties may be separated from the coding, and handled and changed in a very flexible way but not as usual mixed with the coding for dynamic behavior or layout.

In one embodiment, the UI elements and there description may be displayed within a hierarchy. On this hierarchy a rules engine (like SAP BRM or BRF plus) may control the hierarchy element positioning, visibility and properties in a dynamic way.

FIG. 1 illustrates a block diagram of a UI 100 according to an embodiment of the present invention. The UI 100 may comprise two types of UI elements: containers (such as containers 102, 106) and child elements (such as child elements 104, 108, 110 and 112). Each container may have a plurality of properties. Table 1 may depict some exemplary properties:

TABLE 1

Example Properties of a UI Element

| Property name | Possible property value and explanation |
| --- | --- |
| identifier (ID) | alphanumeric string |
| metadata | contextual information about the mother container of the current child element (e.g. if a toolbar is an element of a search result table, it cannot have any SAVE and CANCEL buttons; if a toolbar is an element of the application page, it must have a SAVE and a CANCEL button) |
| height | minimum and maximum values, automatic resizing dependent on number of child elements on/off |
| width | minimum and maximum values, automatic resizing dependent on number of child elements on/off |
| overflow vertically | no, item (number of [always] visible items, number of hidden items [hidden by scrolling]), scrolling (type [interaction of scrolling via paging, vertical scrollbar, vertical panning, scrolling button, mouse wheel, keyboard scroll keys, touch gesture, voice command, etc. with needed or not needed UI visualization on the screen, e.g. a scrollbar]) |
| overflow horizontally | no, item (number of [always] visible items, number of hidden items [hidden by scrolling]), scrolling (type [interaction of scrolling via paging, vertical scrollbar, vertical panning, scrolling button, mouse wheel, keyboard scroll keys, touch gesture, voice command, etc. with needed or not needed UI visualization on the screen, e.g. a scrollbar]) |
| alignment vertically | top, middle, bottom |
| alignment horizontally | left, center, right |
| margin vertically | left, right |
| margin horizontally | top, bottom |
| style | type [e.g. colors, background images, shades, 3d effects, etc.] |
| event | type [e.g. navigation trigger, image exchange, content exchange, etc.] |
| position | x, y, gridfunction (e.g. a mathematical function to calculate a spiral from Archimedes; child elements can be displayed along the spiral curve (black points). The spiral may be spun dynamically according to a time parameter for indicating a history of activities (each activity corresponds to a child element)). |

In one embodiment, the metadata of a UI element may include description of the UI element. The "type" property value may be a used defined data type. For example, the style property may be for visual design and the style type may be defined using cascading style sheets (CSS); the event property may be for interaction design and the event type may be defined using scripting language (e.g., ECMAScript such as JavaScript, etc.). In one or more embodiments, the properties of a UI element may be extended to include other properties in addition to those listed above. For example, the properties may be extended dependent on the common need to describe a user interface. That is, if the granularity of properties is not sufficient or if new properties are found, properties can be added or changed.

The UI elements may be nested. For example, as shown in FIG. 1, the container 106 may be a child container nested within the container 102. Thus, the UI elements of the UI 100 may form a hierarchy with the container 102 being a root level UI element, the child elements 104, 112 and container 106 being siblings of a second level, and the child elements 108 and 110 being a third level. In one embodiment, the UI 100 may be changed dynamically according to a guideline. The guideline may be represented as a set of editable rules, the rules may be integrated in a prototyping tool, which may be integrated in a development environment. A rules engine may be invoked by the development environment to dynamically change the UI according to the rules.

Figure 2:
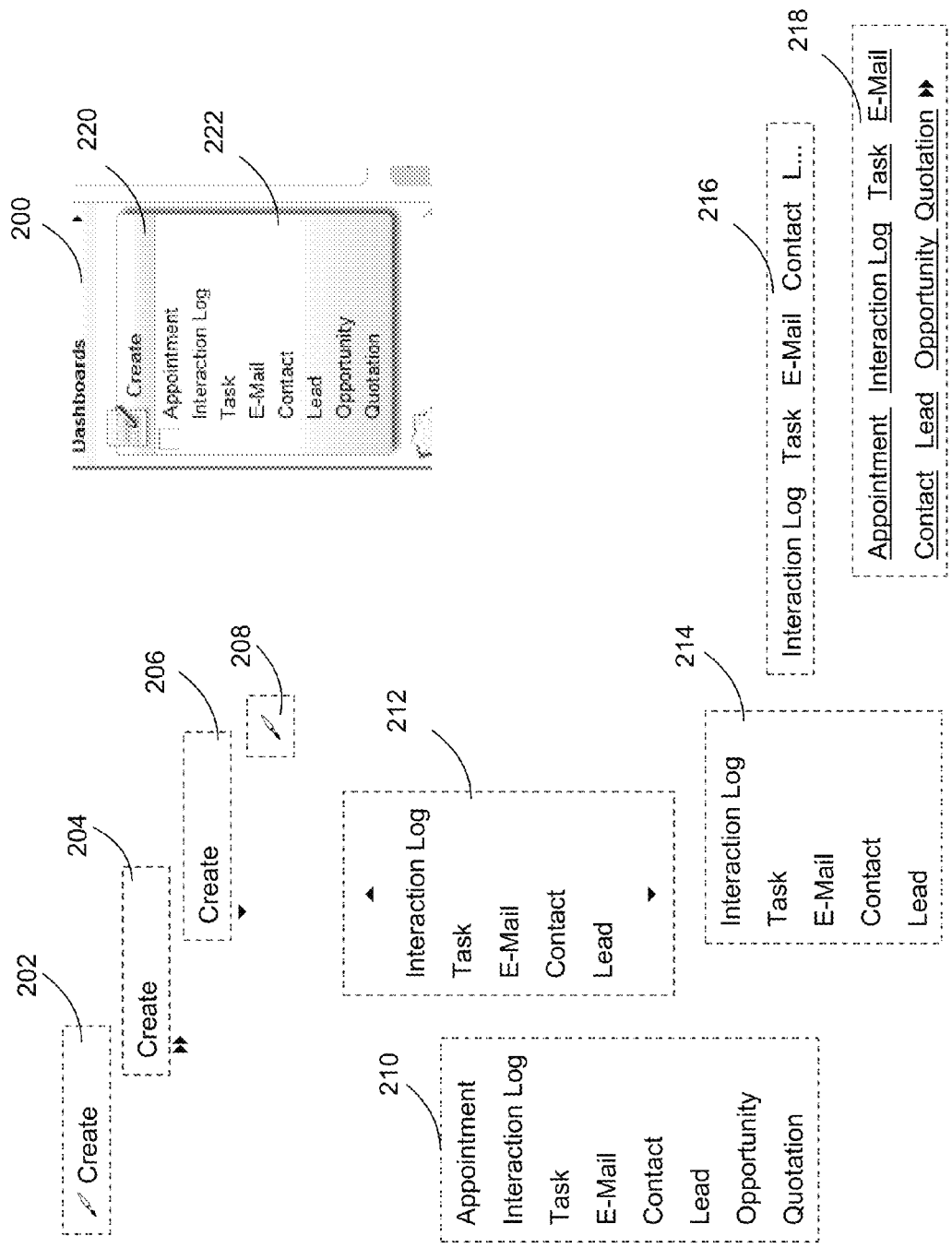
FIG. 2 illustrates various exemplary components to build a composite UI element according to an embodiment of the present invention.

FIG. 2 illustrates various exemplary components to build a composite UI element 200 according to an embodiment of the present invention. The composite UI element 200 may be a stand alone dashboard or a dashboards element of a UI. The composite UI element 200 may include a "create" button 220 and a list 222 including a plurality of tasks for creation. The "create" button 220 may be configured and shown in a variety of ways, such as the buttons 202, 204, 206 and 208. The list 222 of the tasks may be presented in a variety of ways as well, such as, a list 210, a scrolling list 212, a shortened list 214, a horizontal expendable menu bar list 216 (with an Ellipsis symbol indicating more options), a horizontal expendable double line list 218 (with a double right arrow (like a fast forward symbol) indicating more options).

In one embodiment, as described above, the "create" button 220 may be dynamically determined from the options of buttons 202, 204, 206 and 208 according to a design guideline interpreted by a rules engine; and the list 222 may be dynamically determined from the lists of 210, 212, 214, 216 and 218 according to the design guideline also interpreted by the rules engine.

Figure 3:
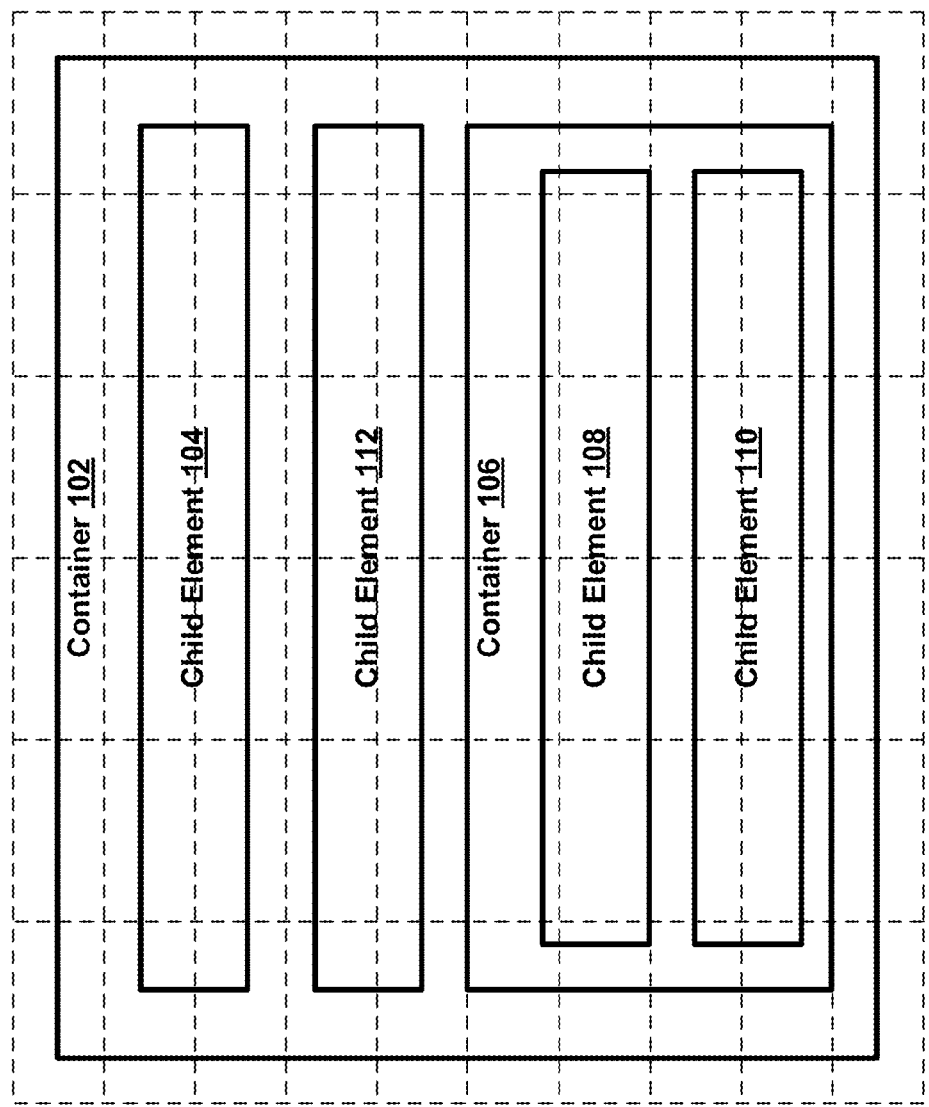
FIG. 3 illustrates a position property according to an embodiment of the present invention.

FIG. 3 illustrates positioning elements of a user interface according to an embodiment of the present invention. As shown in FIG. 3, a grid 300 may be used to position elements of the UI 100. The grid 300 may be defined by the gridfunction property value for the position property of a UI element. The gridfunction may control how the UI elements including containers and child elements may be placed among a grid. In one embodiment, the grid may be adapted to a layout. The grid may be calculated using a mathematical algorithm (see the description for FIG. 4B below) or just follow an array of grid points. The grid 300 may have horizontal lines with a first equal distance and vertical line with a second equal distance (illustrated by a plurality of horizontal dashed lines and a plurality of vertical dashed lines). The first and second equal distances may be a same value, or different values.

Figure 4B:
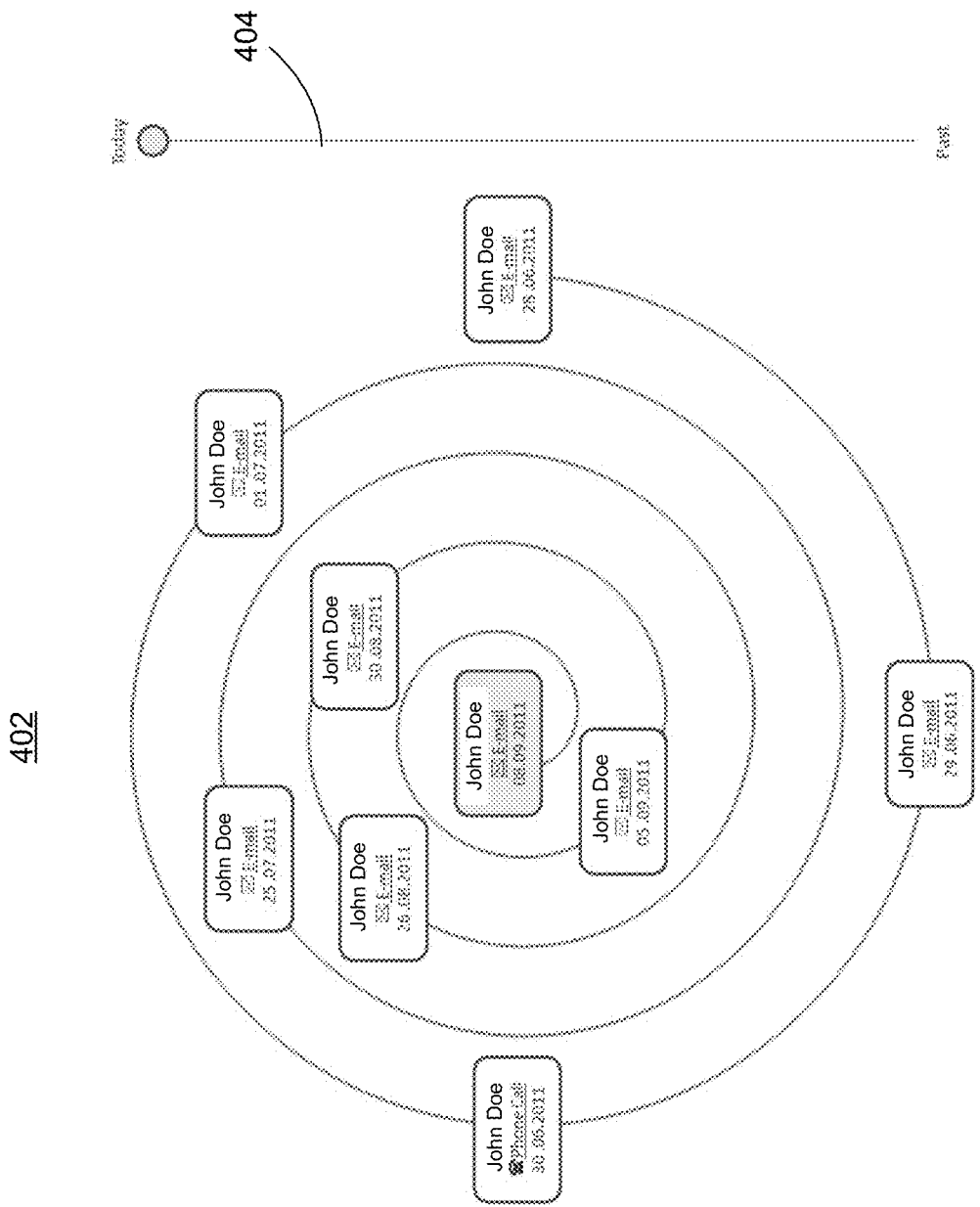
FIG. 4B illustrates a position property according to another embodiment of the present invention.

FIGS. 4A and 4B illustrates a position property according to different embodiments of the present invention. As shown in FIG. 4A, a grid 400 may be used to indicate locations of points of interest on a map. The grid 400 may be formed by a plurality of horizontal lines (shown in dashed lines) with unequal distance and a plurality of vertical lines (shown in dashed lines) with unequal distance. In one embodiment, the unequal distances of the horizontal lines or vertical lines may be selected so that the points of interests may be positioned on a grid point (e.g., an intersection of a horizontal and vertical grid lines). As shown in FIG. 4B, a spiral 402 may be used to indicate locations of points of interests on a spiral. A mathematical function may be used to calculate the spiral from Archimedes. Child elements may be displayed along the spiral curve (e.g., in text boxes). The spiral can be spun dynamically according to a time parameter for indicating a history of activities (each activity may correspond to a child element). The calculation may be based on the following forms: radius=r; angle=$\phi$; constant=a; function r($\phi$)=a $\phi$; parameter x($\phi$)=a $\phi$ cos($\phi$), y($\phi$)=a $\phi$ sin($\phi$); coordinates $x^2+y^2=a^2[\arc\tan(y/x)]^2$.

In one or more embodiments, the grid position of each UI elements of a layout hierarchy may be changed dependent on the time (time of interaction steps or system events). For example, FIG. 4B may show a slider control 404 on the right side. The time schema may be influenced by moving the slider up and down (e.g., the slider may be moved to select a time period for the past 3 month, 6 month, 1 year, etc.). In one embodiment, the spiral 402 may start to spin in a way that child elements fixed on the spiral spins in parallel as well. Additionally, in one embodiment, "new" elements may appear in the center of the spiral and "old" elements may disappear at the end of the spiral. The interactive behavior may visualize a time dependency of elements in a historical view. It may be realized with a grid function that may change grid positions depending on the interaction steps done with a slider (e.g., slider 404).

Figure 5:
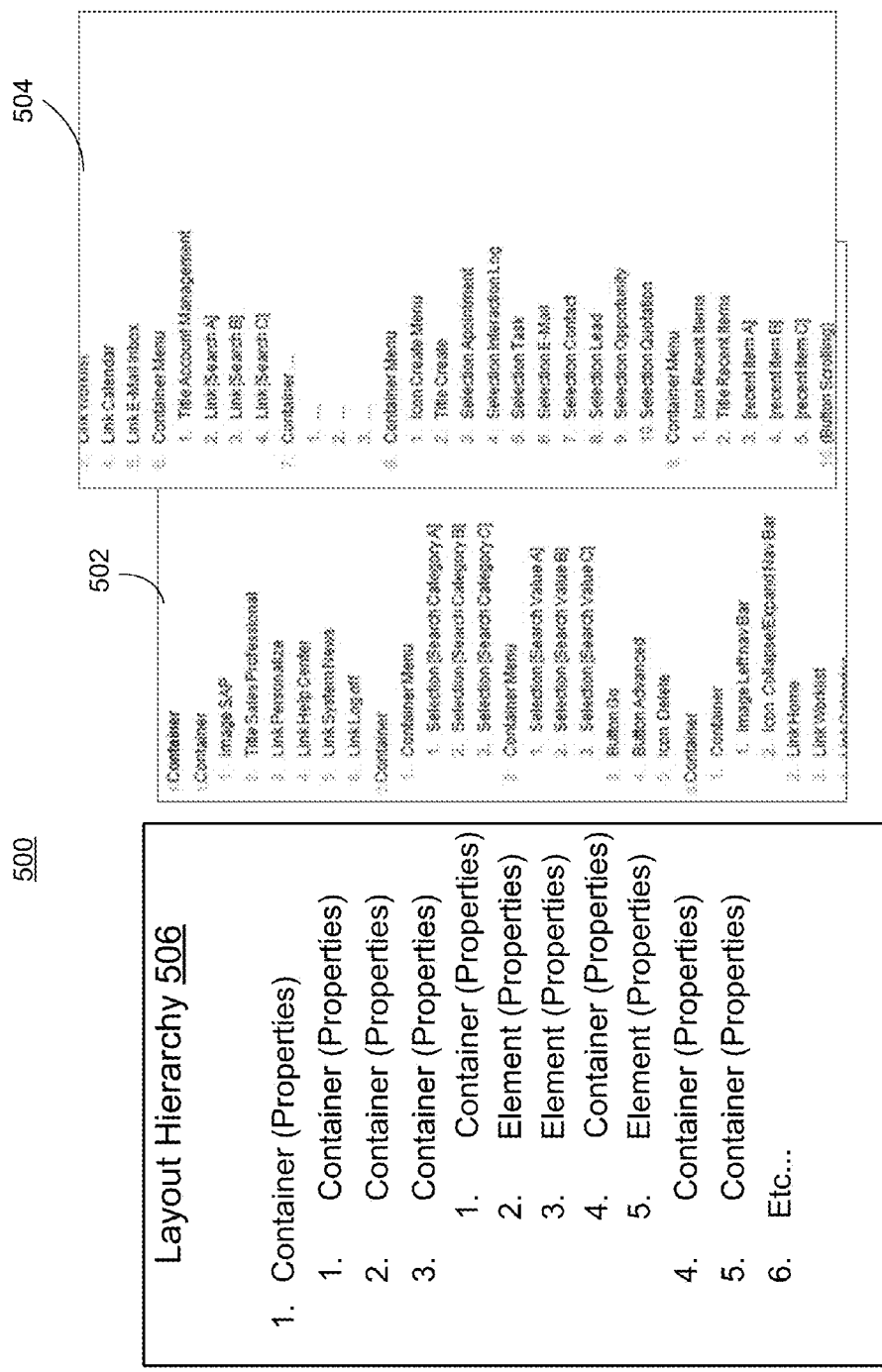
FIG. 5 illustrates two layout hierarchies for a UI according to an embodiment of the present invention.

FIG. 5 illustrates two layout hierarchies 502 and 504 for a UI according to an embodiment of the present invention. Each of two layout hierarchies 502 and 504 may be described by a layout hierarchy description, for example, the layout hierarchy description 506. The layout hierarchy description 506 may list UI element and associated properties in a hierarchical order. In one or more embodiments, the grid position of each UI elements of the layout hierarchies 502 and 504 may be changed dependent on the time (time of interaction steps or system events).

Figure 6B:
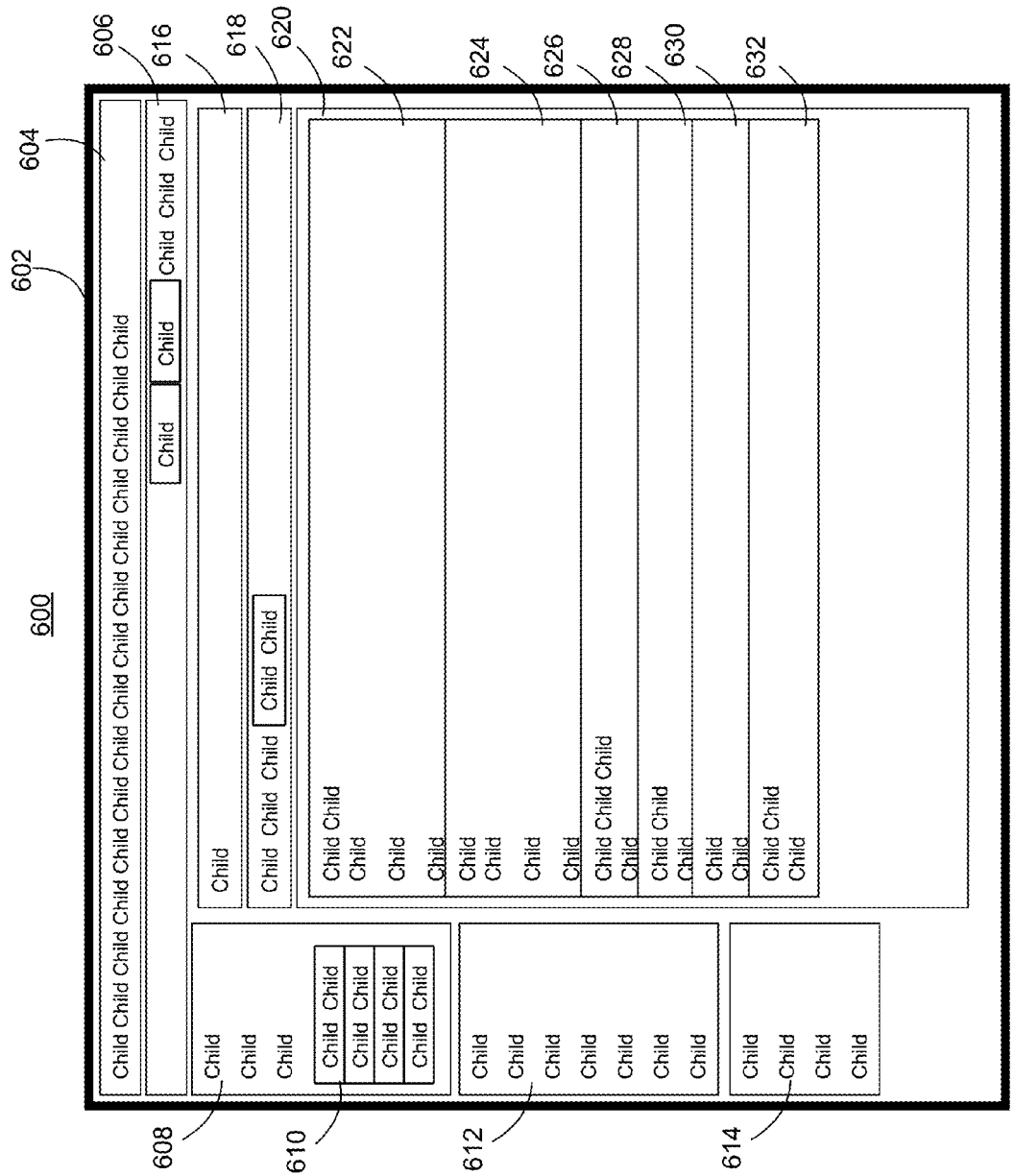

FIGS. 6A, 6B, 6C, 6D and 6E illustrate a UI layout design process for a UI 600 according to an embodiment of the present invention. The identical reference numerals of the UI 600 of those figures refer to same elements. As shown in FIG. 6A, the UI 600 may comprise a container element 602. The container element 602 may be a root container element that may comprise containers 604, 606, 608, 612 and 614. Each of the containers 604, 606, 608, 612 and 614 may include a plurality of child elements (shown as "child"). The container 606 may also include two containers (not labeled) that each has a single child element (first and second child elements in the container 606 included in a box). The container 608 may further include another container 610 that includes a plurality of child elements in a table.

Figure 6C:
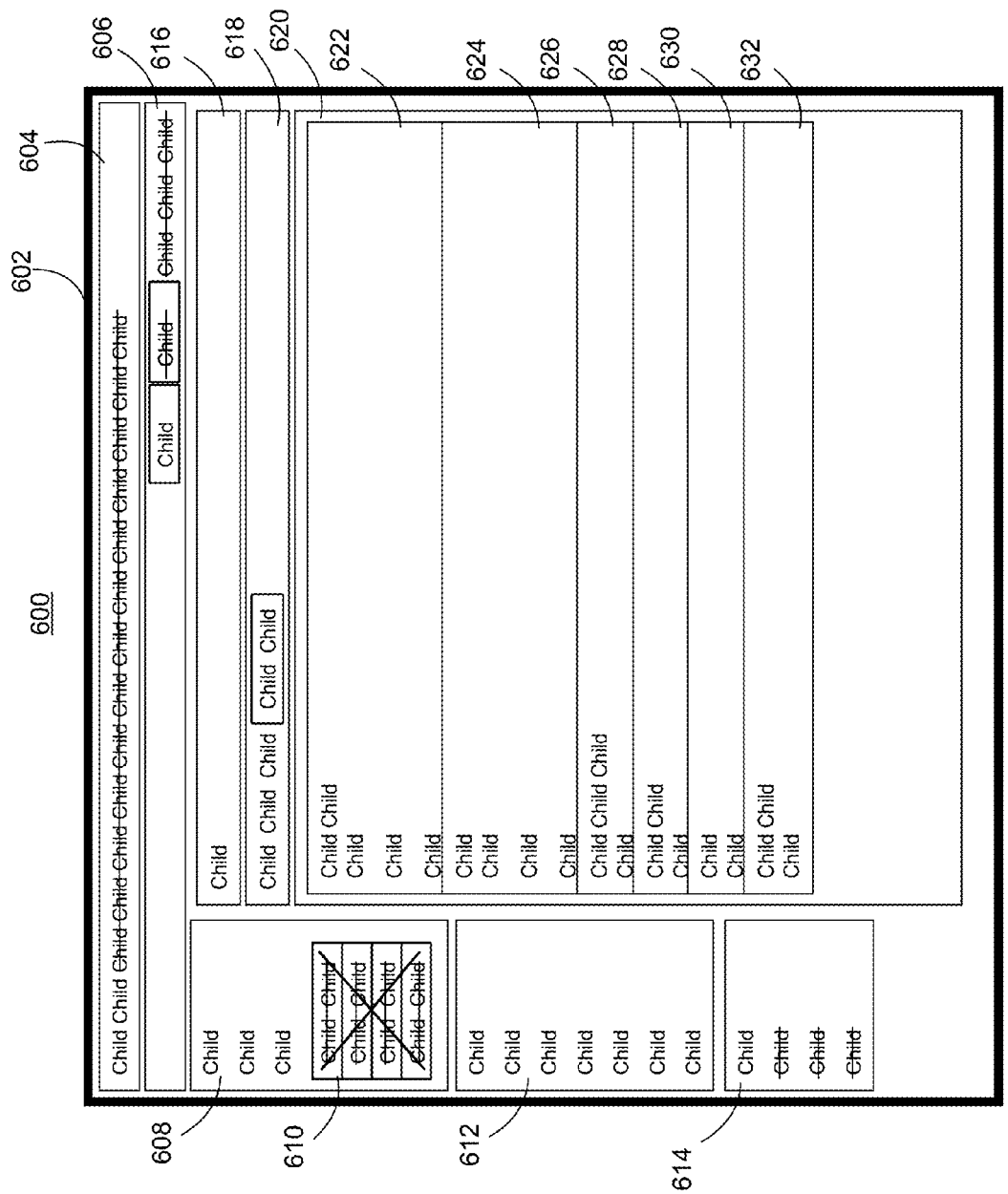

Referring to FIG. 6B, in addition to the elements described above with respect to FIG. 6A, the UI 600 may further include UI elements 616, 618, 620, 624, 628, 630 and 632. The UI 616 may be a child element and the UIs 618, 620, 624, 628, 630 and 632 may be containers. The container 618 may further include a container (not labeled) with two child elements (last two child elements included in a box). The UI 600 may be dynamically changed based on interpretation of a design guideline by a rules engine. Referring to FIG. 6C, some child elements of the containers 604, 606 and 614 may be deleted as shown as crossed out. Further, some containers, such as the container 610 inside the container 608 and a single child container in the container 606 may be deleted as well.

Figure 6D:
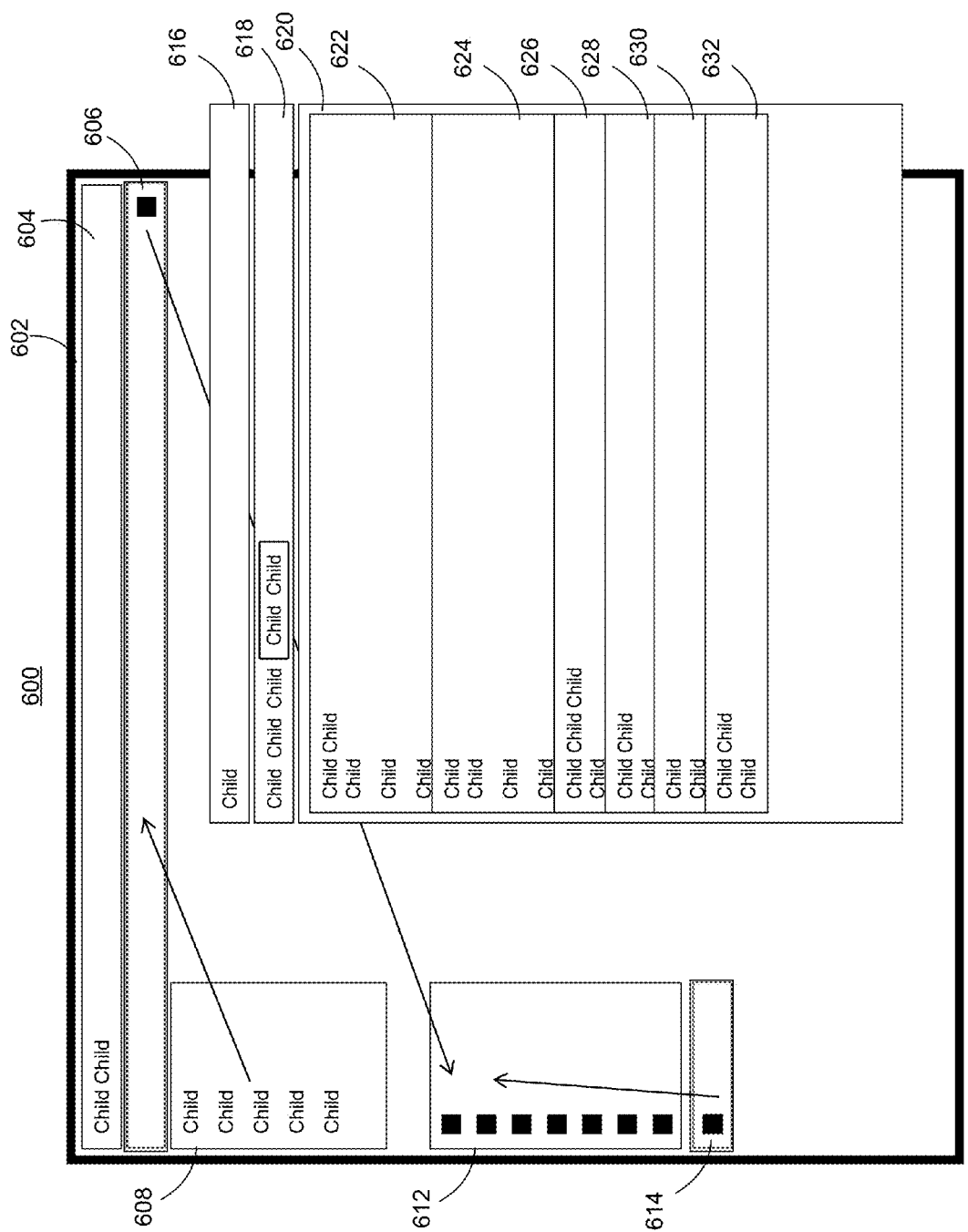
Figure 6E:
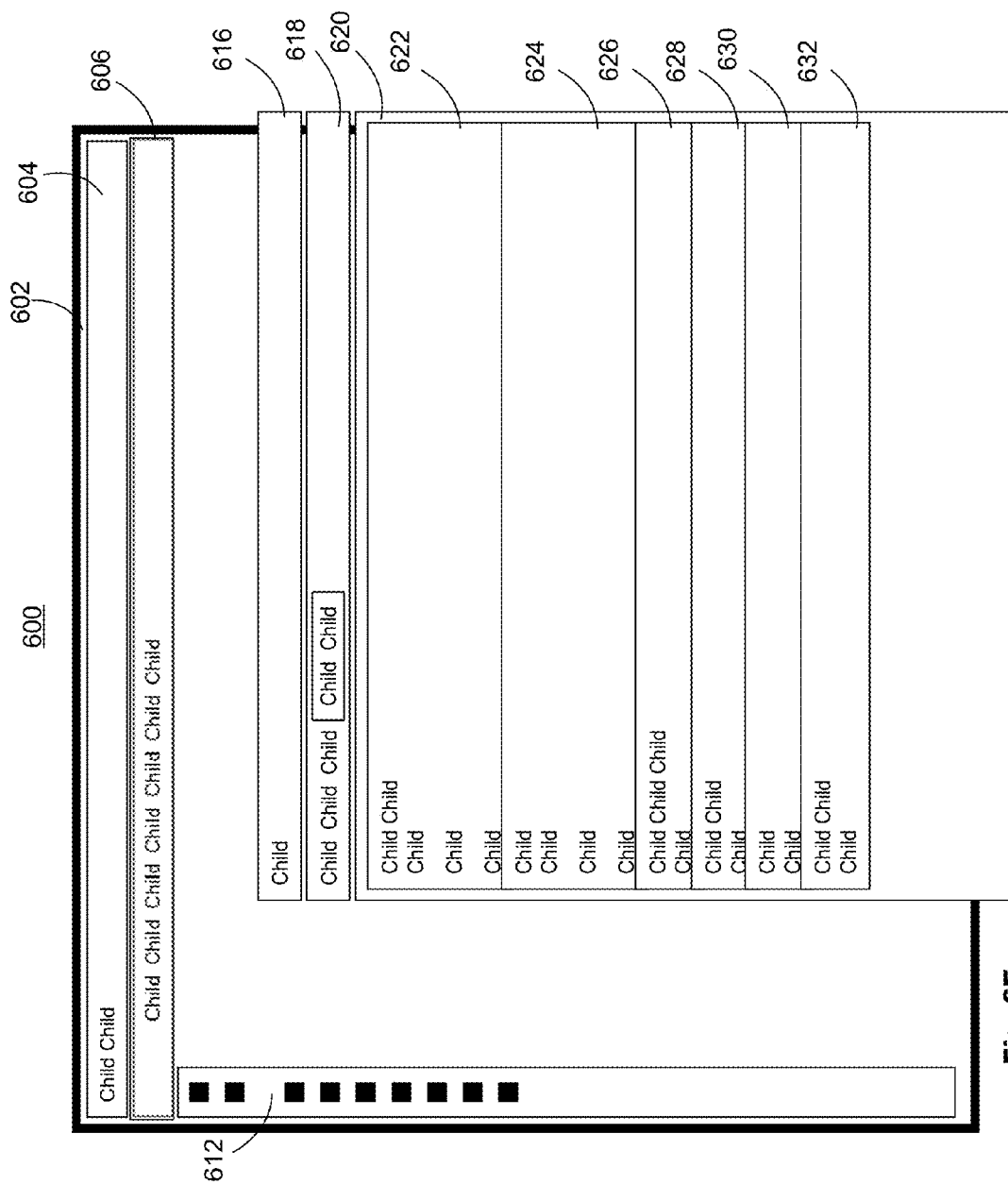

FIG. 6D shows the UI 600 of FIG. 6C after the child elements and containers being removed. Further, FIG. 6D shows two arrows indicating adjustment of positions for the child elements of containers 606, 608 and 614. As shown in FIG. 6E, after the adjustment of positions of the child elements as indicated in FIG. 6D, the container 606 now includes the child elements previously in the container 608 and the container 608 may be eliminated. Further, the remaining child elements of containers 606, 612 and 614 may be combined into a revised container 612. The containers 616, 618, 620, 624, 628, 630 and 632 are not changed in FIG. 6C, 6D or 6E.

Figure 7A:
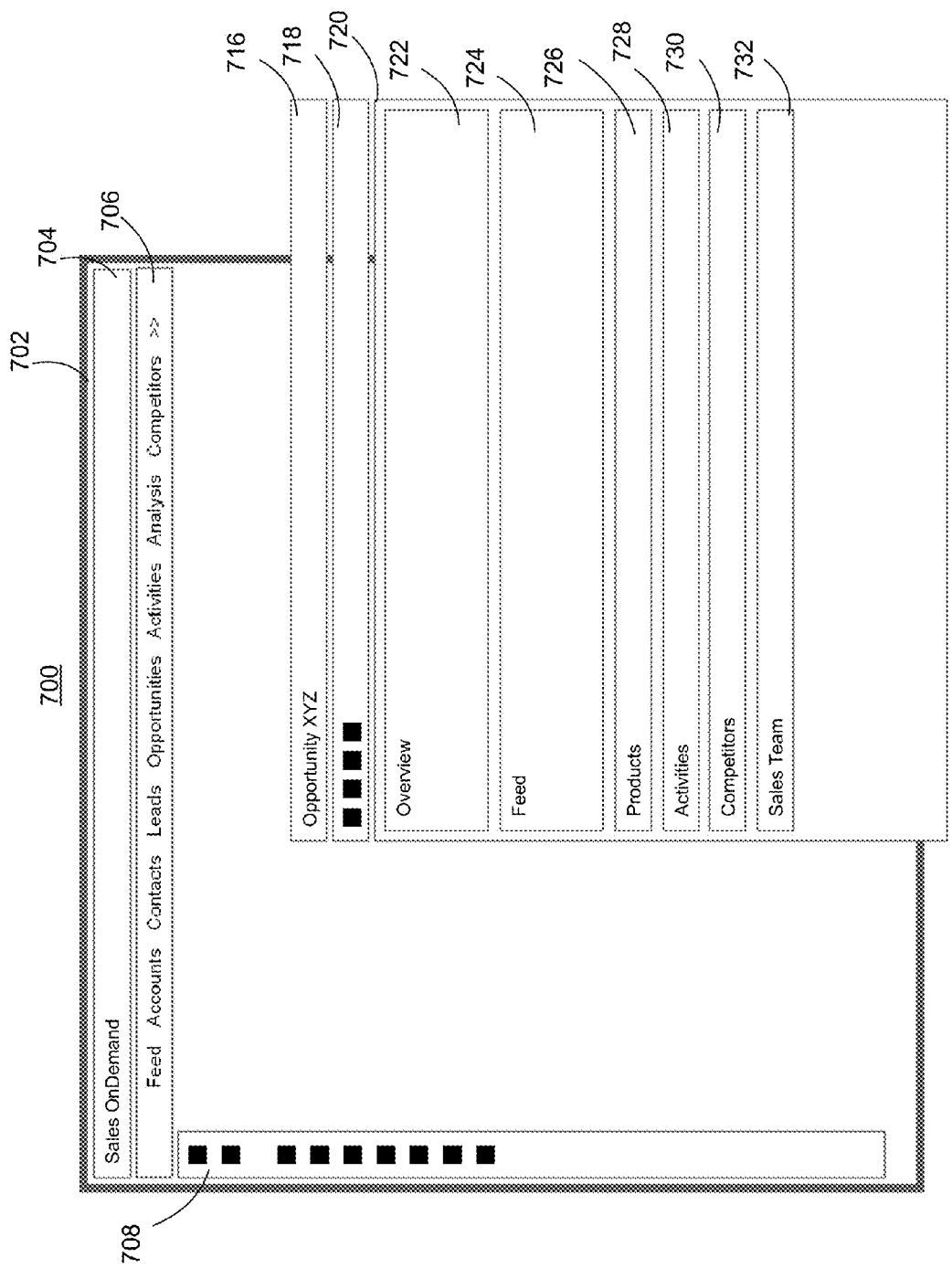
FIGS. 7A, 7B, 7C and 7D illustrate a UI layout design process according to an embodiment of the present invention.

FIGS. 7A, 7B, 7C and 7D illustrate a UI layout design process for a UI 700 according to an embodiment of the present invention. The identical reference numerals of the UI 700 of those figures refer to same elements. As shown in FIG. 7A, the UI 700 may comprise a container 702. The container 702 may be a root container element that may comprise a child element 704 and containers 706 and 708. Each of the containers 706 and 708 may include a plurality of child elements (shown as "child" or black squares). The child element 704 may include a title ("Sales OnDemand") for the UI 700. The container 706 may include an expendable horizontal list of child elements that each may be a button or link (e.g., HTML link). The UI 700 may further comprise containers 716, 718 and 720. The container 716 may include a single child element. The container 718 may include a horizontal list of child elements. The container 720 may include a plurality of child elements 722, 724, 726, 728, 730 and 732 stacked vertically. The container 716, 718 and 720 may be floating. That is, they may be outside of the container 720 and not part of the hierarchy with the container 702 as its root container.

Figure 7B:
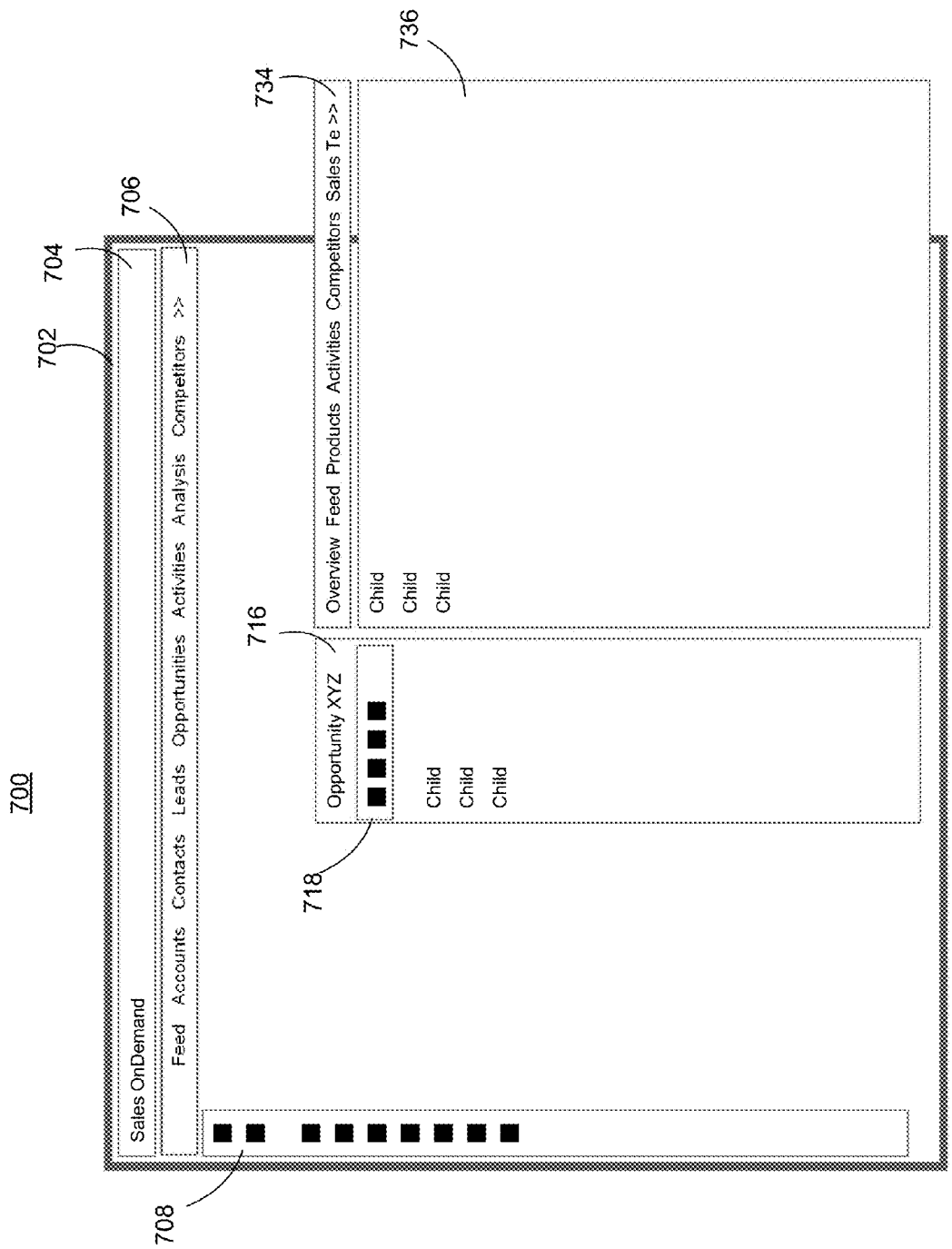

Referring to FIG. 7B, the container 702, child element 704 and containers 706 and 708 may be organized and depicted the same way as in FIG. 7A. The container 716 may be dynamically changed to include the container 718 and other child elements (shown as "child" underneath the container 718). The stacked child elements 722, 724, 726, 728, 730 and 732 of FIG. 7A may be regrouped in a horizontal expendable list and placed into a container 734. Another container 736 may be added to show a plurality of child elements (shown as "child" in the container 736). In one embodiment, the plurality of child elements of the container 736 may show details for a child element selected from the list of child elements of the container 734. As described above, the change of the UI 700 may be based on interpretation of a design guideline by rules engine.

Figure 7C:
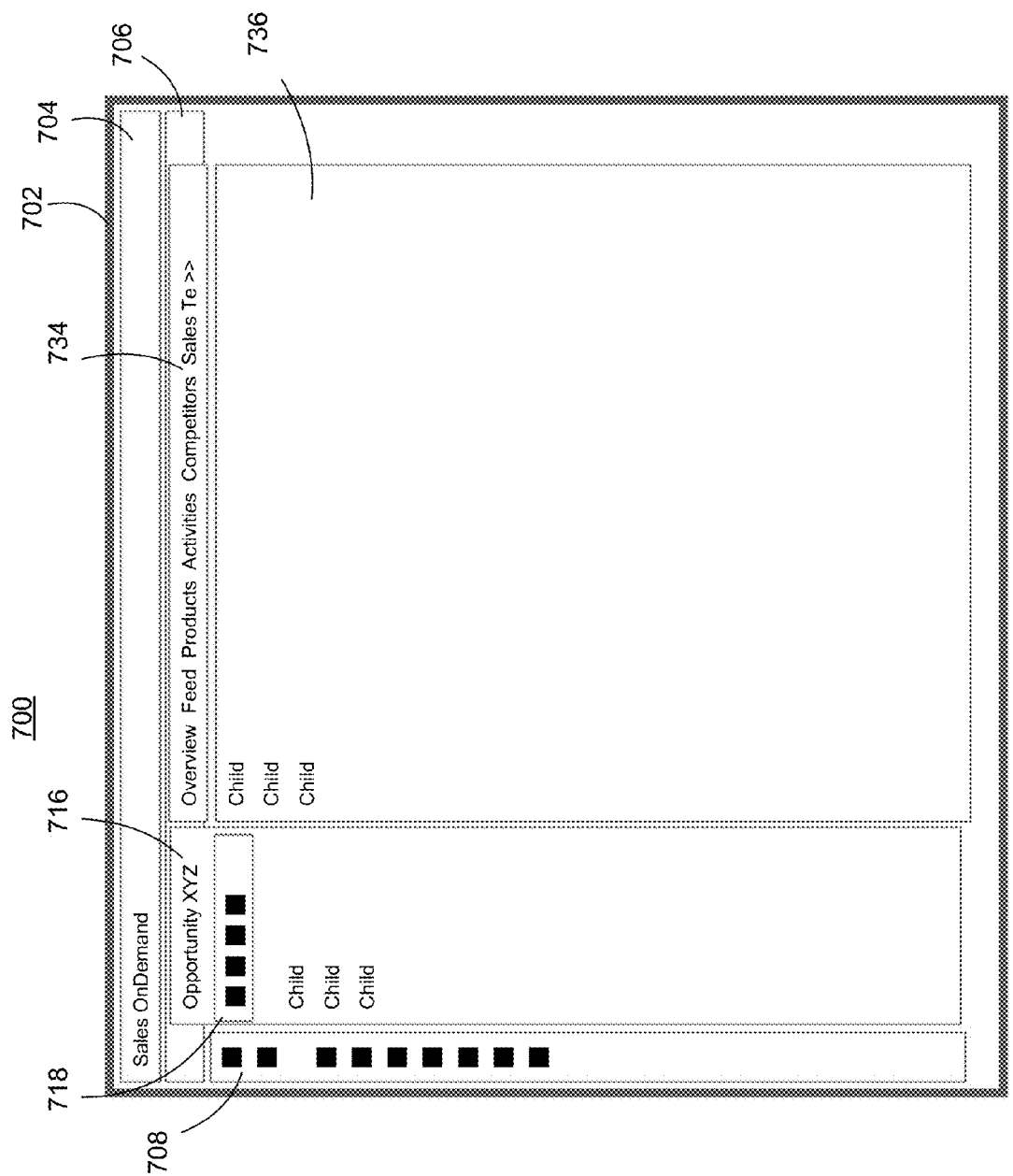
Figure 7D:
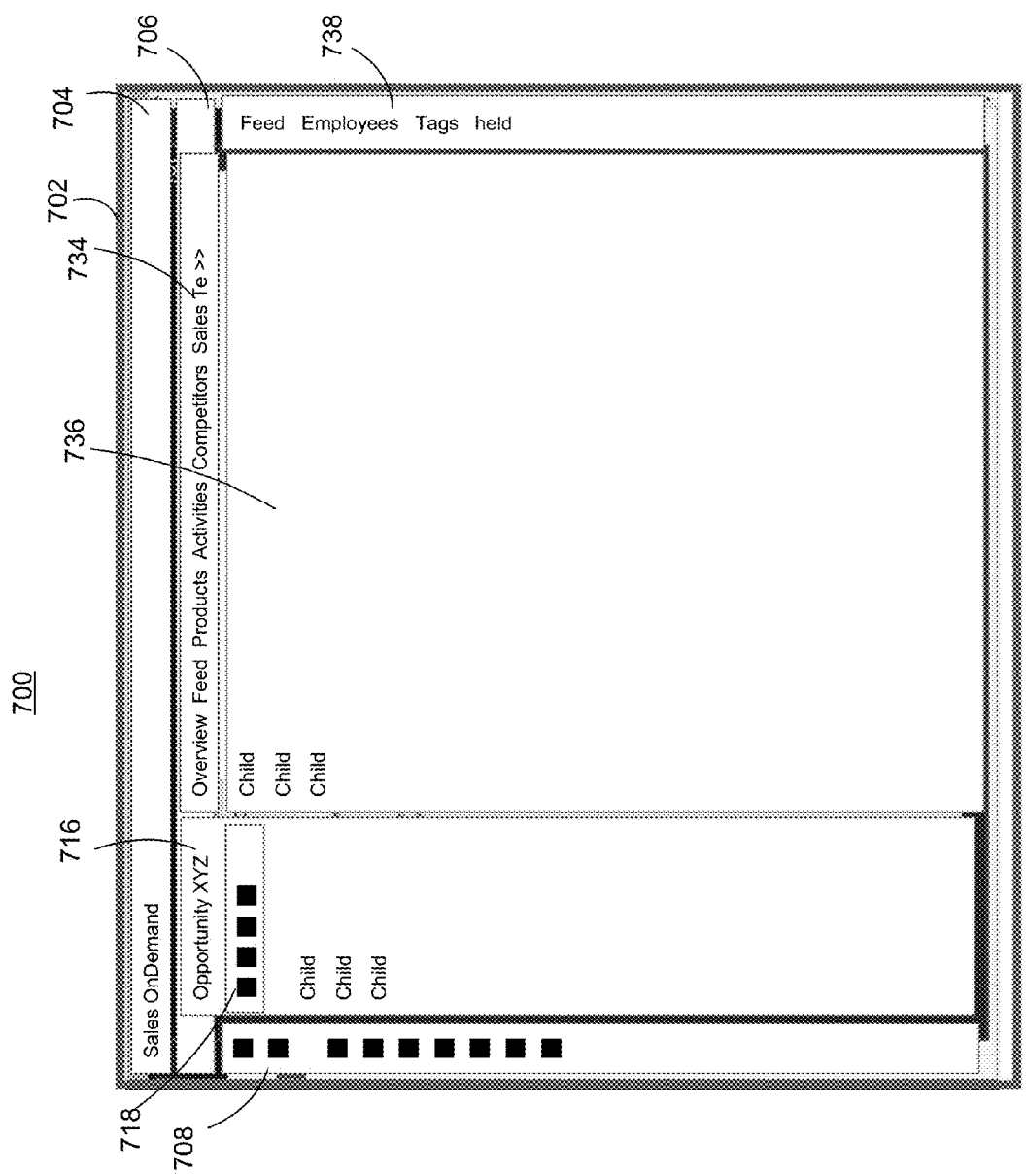

The UI 700 may be further dynamically changed. Referring to FIG. 7C, the containers 716, 734 and 736 may be anchored in the container 702. That is, the containers 716, 734 and 736 may become second level containers under the root container 702 in a hierarchy. The child element 704 and containers 706 and 708 may be the same as in FIG. 7A. As shown in FIG. 7C, the child elements of the container 706 may be obstructed by overlapping containers 716, 734 and 736. Another container 740 may be added as shown in FIG. 7D to show some of the child elements of the container 706.

In one or more embodiments, some child elements of the UI 700 may be buttons or links that may be clicked by a user to perform certain actions, and some child elements may be data items retrieved from one or more databases. At least one child element may be a data item retrieved from a database and presented as a button or link.

Figure 8:
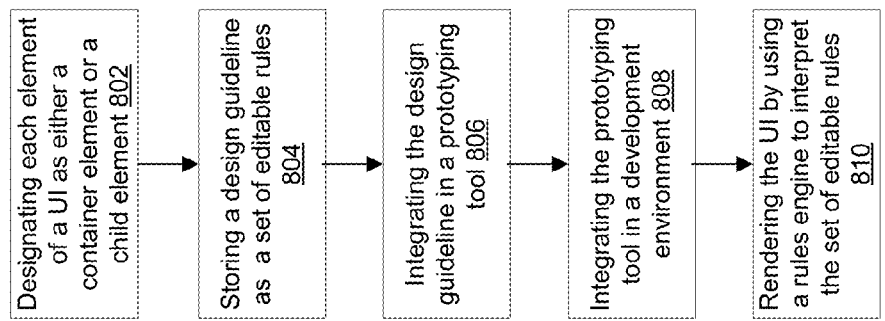
FIG. 8 illustrates an exemplary method for building a UI according to an embodiment of the present invention.

FIG. 8 illustrates an exemplary method 800 for building a UI according to an embodiment of the present invention. A computer processor may be configured to execute program instructions to perform the method 800. At block 802, each element of a UI may be designated as either a container element or a child element. At block 804, a design guideline may be stored as a set of editable rules. As described above, UI design may follow a design guideline, storing the design guideline as a set of rules may enable a rules engine to interpret the design guideline. At block 806, the set of rules representing the design guideline may be integrated in a prototyping tool. At block 808, the prototyping tool may be integrated with a development environment. At block 810, the UI may be rendered by a rules engine interpreting the set of editable rules.

As described above, a UI specification language may be provided in one embodiment of the present invention to be controlled by a rules engine (interactive, visual design) to enable dynamic rendering. The UI specification language may be extendable and comparable. Further, the UI specification language may serve for highly flexible concept changes, being a basis for usability measurements, defining concepts for different (such as desktop, mobile, touchpad) devices, easy configuration in customer projects. Moreover, the interface designed using the UI specification language may be ready for mockup process, user interactions and context base design. And the UI specification language may enable narrowcasting instead of broadcasting UI design. ("Broadcasting" means that a software vender may build software for a broad range of industries and their end users. There were always gaps within the software that does not serve the users need or the software may be built in such a generic way that it doesn't fit properly. "Narrowcasting" means to make the system as much configurable (with flexible rules and a UI description language to switch easily between UI designs) as possible in order to fulfill the end user's needs much better.)

In one embodiment, within an integrated development environment (IDE), the data protocols may be adapted to the UI description language in a way that it is possible to translate each kind of UI design to different frameworks in a unique way. Also, each prototyping tool or configuration tool for creating design mockups or configurations may use this language to generate an outcome. The existing rules engines may be enriched with rules to control the content of the data protocol. The UI description language may be a basic language to ease the communication about UI design and should be available for all people who need to draw, change, review, and check mockups. The UI description language may be used by all people who need to implement, configure and check UIs in development and administration environment. The UI description language may help to keep UI design standards.

Figure 9:
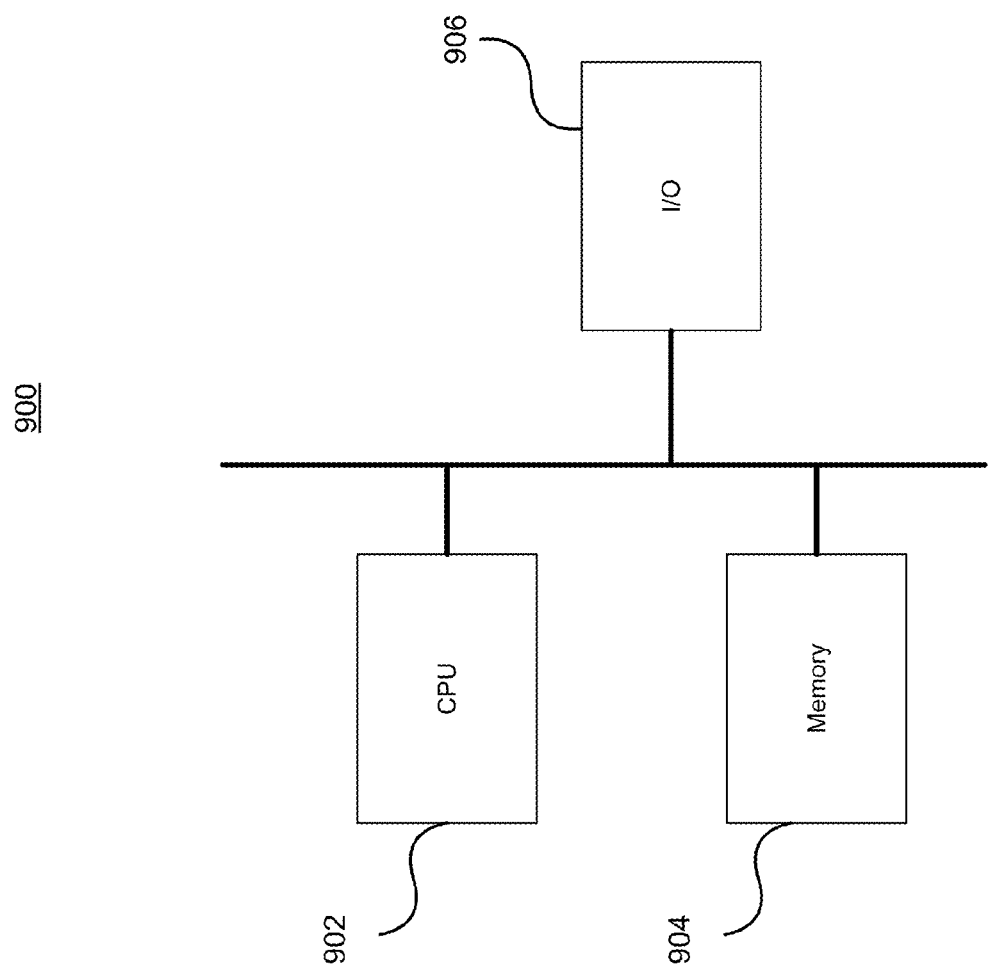
FIG. 9 illustrates an exemplary hardware configuration for implementing a UI design according to an embodiment of the present invention.

FIG. 9 illustrates a controller 900 according to an embodiment of the invention. The controller 900 may be a computing machine, such as a computer. The controller 900 may comprise a processor 902, memory 904, and an I/O device(s) 906. The processor 902 is connected to the memory 904 and I/O device(s) 906. These connections are direct or via other internal electronic circuitry or components.

The processor 902 is a programmable processor that executes instructions residing in the memory 904 to receive and send data via the I/O device(s) 906. The instructions may perform the operations of the application context and rule based UI control described herein. The term programmable processor as used herein is any programmable microprocessor or processor or combination of microprocessors or processors that can operate on digital data, which may be special or general purpose processors coupled to receive data and instructions from, and to transmit data and instructions to, a machine-readable medium. According to one embodiment of the present invention the processor 902 may be an Intel® microprocessor.

Memory 904 is a machine-readable medium that stores data that is processed by processor 902. The term machine-readable medium as used herein is any addressable storage device that stores digital data including any computer program product, apparatus and/or device (e.g., a random access memory (RAM), read only memory (ROM), magnetic disc, optical disc, programmable logic device (PLD), tape, hard drives, RAID storage device, flash memory or any combination of these devices). This may include external machine-readable mediums that are connected to processor 902 via one or more I/O device(s) 906.

The I/O device(s) 906 may include one or more input/output devices (e.g., a touch screen, a network adapter) and interfaces that receive and/or send digital data to and from an external device. Interfaces as used herein are any point of access to an external device where digital data is received or sent, including ports, buffers, queues, subsets thereof, or any other interface to an external device.

The exemplary method and computer program instructions may be embodied on a machine readable storage medium such as a computer disc, optically-readable media, magnetic media, hard drives, RAID storage device, and flash memory. In addition, a server or a database server may include machine readable media configured to store machine executable program instructions. The features of the disclosed embodiments may be implemented in hardware, software, firmware, or a combination thereof and utilized in systems, subsystems, components or subcomponents thereof. When implemented in software, the elements of the disclosed embodiments are programs or the code segments used to perform the necessary tasks. The program or code segments can be stored on machine readable storage media. The "machine readable storage media" may include any medium that can store information. Examples of a machine readable storage medium may include electronic circuits, semiconductor memory device, ROM, flash memory, erasable ROM (EROM), floppy diskette, CD-ROM, optical disk, hard disk, fiber optic medium, any electromagnetic storage device, or optical. The code segments may be downloaded via computer networks such as Internet, Intranet, etc.

Although the invention has been described above with reference to specific embodiments, the invention is not limited to the above embodiments and the specific configurations shown in the drawings. For example, some components shown may be combined with each other as one embodiment, or a component may be divided into several subcomponents, or any other known or available component may be added. The operation processes are also not limited to those shown in the examples. Those skilled in the art will appreciate that the invention may be implemented in other ways without departing from the sprit and substantive features of the invention. For example, features and embodiments described above may be combined with and without each other. The present embodiments are therefore to be considered in all respects as illustrative and not restrictive. The scope of the invention is indicated by the appended claims rather than by the foregoing description, and all changes that come within the meaning and range of equivalency of the claims are therefore intended to be embraced therein.

I claim:

1. A method for generating a user interface (UI) using a UI description language, comprising:
   designating, by a computer processor, each element of the UI as a container element, each container element including: (i) at least one style property defining visual design, and (ii) an event property defining interaction design, the visual design and the interaction design being independent of each other such that the event property corresponds to each of the at least one style properties;
   storing, by the computer processor, a design guideline as a set of editable rules, wherein the design guideline determines a layout of the UI and selects a visual design for each element of the UI from a plurality of possible designs defined by the at least one style property of the respective container element;
   integrating, by the computer processor, the set of editable rules in a prototyping tool;
   integrating, by the computer processor, the prototyping tool in a development environment; and
   dynamically rendering, by the computer processor, the UI by using a rules engine to interpret the set of editable rules and select a design from the plurality of possible designs.

2. The method of claim 1, wherein the at least one property is controlled and adjusted by the rules engine according to the set of editable rules.

3. The method of claim 1, further comprising designating at least one element of the UI as a child element;
   wherein a container element includes at least one child element,
   wherein a child element is a container element including only one child element, and
   wherein the designated container element(s) and child element(s) form a hierarchy.

4. The method of claim 1, further comprising if a container contains only one child element, changing the container to a child element of its parent container.

5. The method of claim 1, further comprising rendering the UI in a spiral and attaching UI elements on the spiral according to a time parameter.

6. The method of claim 5, wherein the UI elements are attached to the spiral with newer elements closer to a center of the spiral and older elements towards an end of the spiral.

7. The method of claim 5, further comprising adjusting a time period for activities to be included in the spiral in response to an adjustment of a slider control;
   wherein a first end of the slider control represents a first point in time and a second end of the slider control represents a second point in time and adjusting the slider control towards a respective end of the slider control causes the spiral to spin corresponding to a time period defined by the first and second points in time and to correspondingly update attached UI elements.

8. The method of claim 7, wherein adjustment of the slider control causes elements falling outside the time period to disappear at an end of the spiral and elements falling within the time period appear at the center of the spiral.

9. The method of claim 1, wherein the design guideline is compatible with a plurality of different frameworks associated with a plurality of devices and defines concepts that are unique to each different device of the plurality of devices.

10. The method of claim 1, wherein the at least one style property is defined using cascading style sheets (CSS) and the event property includes at least one of: a navigation trigger and a content exchange.

11. A non-transitory machine readable storage medium embodied with computer instructions for causing a processor to execute a method for generating a user interface (UI) using a UI description language, the method comprising:
   designating, by a computer processor, each element of the UI as a container element, each container element including: (i) at least one style property defining visual design, and (ii) an event property defining interaction design, the visual design and the interaction design being independent of each other such that the event property corresponds to each of the at least one style properties;
   storing, by the computer processor, a design guideline as a set of editable rules, wherein the design guideline determines a layout of the UI and selects a visual design for each element of the UI from a plurality of possible designs defined by the at least one style property of the respective container element;
   integrating, by the computer processor, the set of editable rules in a prototyping tool;

integrating, by the computer processor, the prototyping tool in a development environment; and dynamically rendering, by the computer processor, the UI by using a rules engine to interpret the set of editable rules and select a design from the plurality of possible designs.

12. The non-transitory machine readable storage medium of claim 11, wherein the at least one property is controlled and adjusted by the rules engine according to the set of editable rules.

13. The non-transitory machine readable storage medium of claim 11, wherein the method further comprises designating at least one element of the UI as a child element;

wherein a container element includes at least one child element, wherein a child element is a container element including only one child element, and wherein the designated container element(s) and child element(s) form a hierarchy.

14. The non-transitory machine readable storage medium of claim 11, wherein the method further comprises if a container contains only one child element, changing the container to a child element of its parent container.

15. The non-transitory machine readable storage medium of claim 11, wherein the method further comprises rendering the UI in a spiral and attaching UI elements on the spiral according to a time parameter.

16. The non-transitory machine readable storage medium of claim 15, wherein the UI elements are attached to the spiral with newer elements closer to a center of the spiral and older elements towards an end of the spiral.

17. The non-transitory machine readable storage medium of claim 15, wherein the method further comprises adjusting a time period for activities to be included in the spiral in response to an adjustment of a slider control;

wherein a first end of the slider control represents a first point in time and a second end of the slider control represents a second point in time and adjusting the slider control towards a respective end of the slider control causes the spiral to spin corresponding to a time period defined by the first and second points in time and to correspondingly update attached UI elements.

18. A system comprising:

a storage for a set of editable rules representing a user interface (UI) design guideline;

a user input-output device coupled to the storage;

a processor responsive to inputs from the user input device and coupled to the storage, the processor configured to:

designate each element of the UI as a container element, each container element including: (i) at least one style property defining visual design, and (ii) an event property defining interaction design, the visual design and the interaction design being independent of each other such that the event property corresponds to each of the at least one style properties;

store a design guideline as a set of editable rules, wherein the design guideline determines a layout of the UI and selects a visual design for each element of the UI from a plurality of possible designs defined by the at least one style property of the respective container element;

integrate the set of editable rules in a prototyping tool;

integrate the prototyping tool in a development environment; and dynamically render the UI by using a rules engine to interpret the set of editable rules and select a design from the plurality of possible designs.

19. The system of claim 18, wherein the at least one property is controlled and adjusted by the rules engine according to the set of editable rules.

20. The system of claim 18, wherein the designated container element(s) and child element(s) form a hierarchy.

21. The system of claim 18, wherein the processor is further configured to, if a container contains only one child element, change the container to a child element of its parent container.

22. The system of claim 18, wherein the processor is further configured to render the UI in a spiral and attach UI elements on the spiral according to a time parameter.

23. The system of claim 22, wherein the UI elements are attached to the spiral with newer elements closer to a center of the spiral and older elements towards an end of the spiral.

24. The system of claim 22, wherein the processor is further configured to adjust a time period for activities to be included in the spiral in response to an adjustment of a slider control;

wherein a first end of the slider control represents a first point in time and a second end of the slider control represents a second point in time and adjusting the slider control towards a respective end of the slider control causes the spiral to spin corresponding to a time period defined by the first and second points in time and to correspondingly update attached UI elements.

* * * * *